US012608812B2

(12) United States Patent
Xue et al.

(10) Patent No.: US 12,608,812 B2
(45) Date of Patent: Apr. 21, 2026

(54) SYSTEM AND METHOD FOR SEGMENTING THREE- DIMENSIONAL IMAGES OF PANCREASES AND TUMORS

(71) Applicant: SHANDONG NORMAL UNIVERSITY, Jinan (CN)

(72) Inventors: Jie Xue, Jinan (CN); Dengwang Li, Jinan (CN); Xiyu Liu, Jinan (CN); Qi Li, Jinan (CN); Guanzhong Gong, Jinan (CN); Jianbo Wang, Jinan (CN); Pu Huang, Jinan (CN)

(73) Assignee: SHANDONG NORMAL UNIVERSITY, Jinan (CN)

( * ) Notice: Subject to any disclaimer, the term of this patent is extended or adjusted under 35 U.S.C. 154(b) by 382 days.

(21) Appl. No.: 18/196,126

(22) Filed: May 11, 2023

(65) Prior Publication Data

US 2023/0368388 A1 Nov. 16, 2023

(30) Foreign Application Priority Data

May 11, 2022 (CN) ........................ 202210508340.X

(51) Int. Cl.
| | |
|---|---|
| *G06T 7/11* | (2017.01) |
| *G06T 7/00* | (2017.01) |
| *G06T 9/00* | (2006.01) |

(52) U.S. Cl.
CPC .............. *G06T 7/11* (2017.01); *G06T 7/0012* (2013.01); *G06T 9/002* (2013.01); *G06T 2207/10081* (2013.01); *G06T 2207/10088* (2013.01); *G06T 2207/20081* (2013.01); *G06T 2207/20084* (2013.01); *G06T 2207/20132* (2013.01); *G06T 2207/30092* (2013.01); *G06T 2207/30096* (2013.01)

(58) Field of Classification Search
CPC .................... G06T 2207/20084; G06T 7/0012
See application file for complete search history.

(56) References Cited

U.S. PATENT DOCUMENTS

| | | | | |
|---|---|---|---|---|
| 11,328,430 | B2 * | 5/2022 | Zhou | G06T 7/11 |
| 12,190,523 | B2 * | 1/2025 | Yoo | A61B 6/032 |
| 2018/0218503 | A1 * | 8/2018 | Xu | G06N 3/04 |
| 2023/0368388 | A1 * | 11/2023 | Xue | G06T 7/0012 |
| 2024/0169180 | A1 * | 5/2024 | Yang | G06N 3/063 |
| 2025/0020481 | A1 * | 1/2025 | Xie | G01C 21/3837 |

FOREIGN PATENT DOCUMENTS

| | | | | | |
|---|---|---|---|---|---|
| CN | 113554642 | A | * | 10/2021 | G06T 7/70 |
| CN | 113870258 | A | * | 12/2021 | G06F 18/213 |
| CN | 114693898 | A | * | 7/2022 | G06N 3/045 |

* cited by examiner

*Primary Examiner* — Gandhi Thirugnanam
(74) *Attorney, Agent, or Firm* — Oliff PLC

(57) ABSTRACT

A method and system for segmenting three-dimensional images of pancreases and tumors, including: acquiring 3D images of the pancreas and the tumor and preprocessing same with a soft tissue window to control the intensity value of the image within a set range; cropping all images into block-shaped regions of a set size and feeding same into a trained convolutional neural network model, and when training a network, dynamically adjusting the learning weight between the pancreas and the tumor under the guidance of temperature to learn the features of the pancreas and the tumor; and after performing data preprocessing on the 3D images of the pancreas and labels, using the trained network model for online testing and evaluating, and outputting the segmentation result.

8 Claims, 4 Drawing Sheets

SYSTEM AND METHOD FOR SEGMENTING THREE- DIMENSIONAL IMAGES OF PANCREASES AND TUMORS

TECHNICAL FIELD

The present invention belongs to the technical field of image segmentation, and in particular relates to a system and method for segmenting three-dimensional images of pancreases and tumors.

BACKGROUND

The description in this section merely provides background information related to the present invention and does not necessarily constitute the prior art.

It is difficult to automatically segment images of pancreases and tumors due to the following factors.

1) In three-dimensional (3D) images, there are phenotypic differences between tumors and pancreases in the same patient and in different patients, such as the shape and volume.

2) In 3D images, the contrast between the pancreas and the tumor and between the pancreas and abdominal perienchyma is low.

3) In 3D images, the pancreas is retroperitoneal and both the volume of the pancreas and the volume of the tumor are small.

Since the tumor is embedded in or around the pancreas, its features are not obvious. If we do not pay more attention to the smaller tumor during the network learning process, the segmentation result will be unsatisfactory.

However, existing methods mainly use a fixed weight for the tumor and the pancreas throughout the learning process, ignoring the imbalance in feature extraction caused by the phenotypic differences between the two tissue. It is a difficult and time-consuming process to manually adjust these weights, which requires the researcher to have sufficient mastery and knowledge base for the study data to set an appropriate value. In addition, this manual involvement cannot accomplish adaptive adjustment of the overall loss function to obtain a better segmentation performance.

SUMMARY

To overcome the above deficiencies of the prior art, the present invention provides a system for segmenting three-dimensional images of pancreases and tumors, which enables accurate segmentation of images of the pancreas and the tumor.

In order to achieve the foregoing objective, one or more embodiments of the present invention provide the following technical solutions.

In the first aspect, a method for segmenting three-dimensional images of pancreases and tumors is disclosed, including:

acquiring 3D images of the pancreas and the tumor and preprocessing same with a soft tissue window to control the intensity value of the image within a set range;

cropping all images into block-shaped regions of a set size and feeding same into a trained convolutional neural network model, and when training a network, dynamically adjusting the learning weight between the pancreas and the tumor under the guidance of temperature to learn the features of the pancreas and the tumor; and after performing data preprocessing on the 3D images of the pancreas and labels, using the trained network model for online testing and evaluating, and outputting the segmentation result.

As a further technical solution, the convolutional neural network model is based on an original U-Net with the addition of an attention mechanism as well as a deep supervision mechanism, called an NAD skeleton.

As a further technical solution, the attention mechanism is used mainly for jump connections in an encoder-decoder, and a feature map obtained from the first four layers of the encoder is enabled to pass through the attention mechanism to obtain a feature map with an attention map, thus assisting the decoder.

After the decoder performs decoding, the segmentation result of multiple layers is obtained, and the NAD skeleton is constrained using the balanced temperature loss, and the learning process of the network is globally optimized by combining back propagation and the rigid temperature loss to alleviate the possible problem of a local optimum.

When the network is trained to a certain extent, the soft temperature loss is used for updating the average shift value of the loss, the convolutional neural network model is further fine-tuned by improving the learning rate, and the learning trend and the convergence range of the convolutional neural network model is determined to further refine the segmentation of the pancreas and the tumor.

As a further technical solution, the balanced temperature loss is used so that the network dynamically adjusts the learning weight between the pancreas and the tumor under the guidance of temperature to learn the features of the pancreas and the tumor.

As a further technical solution, the network is trained in combination with a binary cross-entropy loss function and the soft Dice loss as a loss function of the NAD skeleton to constrain learning, and temperature is introduced in the soft Dice loss to dynamically adjust the learning weight between the tumor and the pancreas to balance feature selection.

The pancreas is given a relatively large weight under the guidance of temperature at the early stage of network learning, and then a tumor region is dynamically given a larger weight as the network learning continues, so that the features of the pancreas and the tumor can be dynamically learned in the process of network learning.

As a further technical solution, the learning process of the network is globally optimized by combining back propagation and the rigid temperature loss, specifically:

the acceptable probability is dynamically adjusted using the internal temperature. As the internal temperature decreases, the acceptable probability decreases and the network moves from a fully trained state to a convergence state, globally guiding the entire network.

As a further technical solution, the soft temperature loss is used for assisting the network in adaptively adjusting the learning rate in the event of a greater focus on the $k^{th}$ loss.

In the second aspect, a system for segmenting three-dimensional images of pancreases and tumors is disclosed, including:

an image processing module, configured to acquire 3D images of the pancreas and the tumor and preprocess same with a soft tissue window to control the intensity value of the image within a set range;

a network training module, configured to crop all images into block-shaped regions of a set size and feed same into a trained convolutional neural network model, and when training a network, dynamically adjust the learning weight between the pancreas and the tumor under the guidance of temperature to learn the features of the pancreas and the tumor; and a segmenting module, configured to after performing data preprocessing on the 3D images of the pancreas and labels, use the trained network model for online testing and evaluating, and output the segmentation result.

The above one or more technical solutions have the beneficial effects as follows.

The technical solution of the present invention uses the balanced temperature loss (BTL) to dynamically adjust the learning weight according to the temperature, resulting in a good performance of segmentation of both the tumor and the pancreas. In addition, to avoid the case where the network falls into a local optimum and an unsatisfactory result is generated, based on the Metropolis principle, the technical solution of the present invention proposes the rigid temperature loss (RTL) accepting an unimproved shift with a certain probability to guide the whole training process. The technical solution of the present invention further proposes the soft temperature loss (STL). The average shift of the loss is updated by means of temperature to control the learning speed, so as to fine-tune the network and further refine the segmentation result when the segmentation result of the tumor and the pancreas tends to be steady. For the joint segmentation of organs and the associated tumors thereof (e.g. the pancreas and the tumor), dynamically adjusting network learning points can significantly improve the segmentation performance.

The advantages of additional aspects of the present invention will be set forth in part in the description below, parts of which will become apparent from the description below, or will be understood from the practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
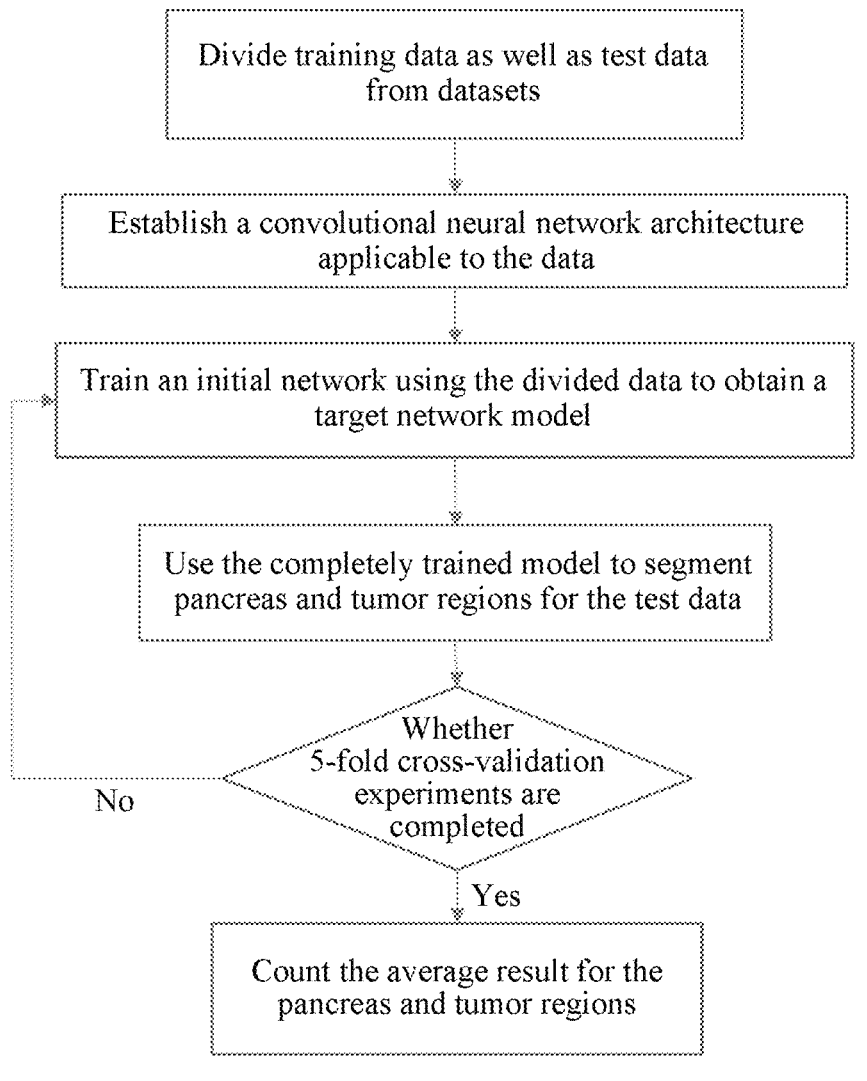
FIG. 1 is a flowchart of a method according to an embodiment of the present invention.

It should be noted that, the following detailed descriptions are all exemplary, and are intended to provide further descriptions of the present invention. Unless otherwise specified, all technical and scientific terms used herein have the same meanings as those usually understood by a person of ordinary skill in the art to which the present invention belongs.

It should be noted that the terms used herein are merely used for describing specific implementations, and are not intended to limit exemplary implementations of the present invention.

Embodiments in the present invention and features in the embodiments may be mutually combined in case that no conflict occurs.

Deep convolutional neural networks (CNNs) have achieved good results in medical image segmentation because of their ability to learn hierarchies of increasingly complex feature representations directly from data and to automatically identify anatomical structure contours. An attention mechanism is commonly used for aiding medical image segmentation while automatically focusing on tissue of different shapes and sizes, eliminating the need for tissue/organ localization modules in general cascaded convolutional neural networks. A deep supervision mechanism not only helps the hidden layer of the convolutional neural network to learn more intuitive features, but also alleviates the problem of gradient explosion and gradient disappearance to a certain extent. In addition, nnUNet shows good performance on a wide range of segmentation tasks, thanks to its automatic analysis on individual datasets and network configuration adjustment. Therefore, the technical solution of the present disclosure will use nnUNet (named as an NAD network) with the attention mechanism and the deep supervision mechanism as a basic network to segment the pancreas and the tumor.

Different training strategies may lead to different segmentation performance or even cause the network to fall into a local optimum. It has been investigated that different global optimization strategies (e.g., the differential search algorithm, Adam variant) are combination with the convolutional neural network. Different from the global optimization strategy, there are also some studies that use weighted shift averages to represent and reflect the learning trend of the network to achieve a better state of convergence. Therefore, in the embodiment of the present disclosure, it is considered that both global optimization and local optimization strategies are used for avoiding the case where the network falls into a local optimum and further improve the performance of the network. Inspired by the simulated annealing algorithm, it is considered in the technical solution of the present disclosure that the network is enabled to be optimized from global (rigid) optimization to local (soft) optimization under the guidance of temperature.

Thus, for the joint segmentation of organs and the associated tumors thereof (e.g., the pancreas and the tumor), dynamically adjusting network learning points can significantly improve segmentation performance.

Embodiment I

This embodiment discloses a method for segmenting three-dimensional images of pancreases and tumors, with reference to FIG. 1, including:

dividing training data as well as test data from acquired datasets, establishing a convolutional neural network architecture applicable to the data, training an initial network using the divided data to obtain a target network model, using the completely trained model to segment pancreas and tumor regions for the test data, and counting the average result for the pancreas and tumor regions after completing validation experiments.

During specific implementation, 3D images of the pancreas and the tumor are acquired and are preprocessed with a soft tissue window to control the intensity values of the image within a set range.

All images are cropped into block-shaped regions of a set size and are fed into a trained convolutional neural network model, and when training a network, the learning weight between the pancreas and the tumor are dynamically adjusted under the guidance of temperature to learn the features of the pancreas and the tumor.

The trained network model is used to perform data augmentation as well as online testing and evaluating on the data, and the segmentation result is outputted The pancreas, which occupies more voxels than the tumor, tends to dominate the feature learning process of the network, thus weakening the tumor segmentation performance. To find a balance between the pancreas and the tumor, the embodiment of the present disclosure uses the balanced temperature loss (BTL) to dynamically adjust the learning weight according to the temperature, resulting in a good performance of segmentation of both the tumor and the pancreas. In addition, to avoid the case where the network falls into a local optimum and an unsatisfactory result is generated, based on the Metropolis principle, the rigid temperature loss (RTL) accepting an unimproved shift with a certain probability to guide the whole training process is proposed. The soft temperature loss (STL) is further proposed. The average shift of the loss is updated by means of temperature to control the learning speed, so as to fine-tune the network and further refine the segmentation result when the segmentation result of the tumor and the pancreas tends to be steady.

The network proposed in the present invention is implemented using a PyTorch framework on an NVIDIA Tesla V100 GPU with a 32 GB RAM. All images are cropped into patches of the size of 64×192×192 to be fed into the network.

An SGD algorithm iteratively updates the weight of a convolutional kernel to optimize the model. The initial learning rate is 0.01 and the Batch size is 2. The evaluation time for each patient in a test dataset is 21 seconds. The dataset (MSD pancreas dataset) used in the embodiment patent of the present disclosure is provided by the Memorial Sloan Kettering Cancer Center and segmentation thereof is more challenging due to the imbalance in labels of large (background), medium (pancreas) and small (tumor) structures. The dataset contains 281 abdomen enhanced CT with pancreas and tumor labels, manually labeled by experts for the abdomen in the radiology department using Scout. To further investigate the robustness of the method, the embodiment of the present disclosure also applies it to a 2020BraTs dataset, including 369 MRI images in four modalities (e.g., T1 modality, contrast-enhanced T1 modality, T2 modality and FLAIR modality). The present invention uses 5-fold cross-validation (CV-5) for the two datasets.

The overall process is to input the 3D images of the pancreas and the labels, crop a training set so as to remove a small number of all-black areas, perform normalization (subtracting the mean value and dividing by the standard deviation), and perform data enhancement (using common data enhancement operations such as rotation, scaling, adding Gaussian noise, performing Gaussian blurring, brightness adjustment, contrast adjustment, Gamma adjustment, up/down and left/right mirroring) to alleviate data deficiencies and the impact of data imbalance. The images and the labels are then fed into the network in the form of the patch (the size of 64×192×192). According to the embodiment of the present disclosure, the original U-Net with the addition of an attention mechanism as well as a deep supervision mechanism adds a weight to the loss of each layer, with the higher the resolution the greater the weight, simply to alleviate the problem of low transparency of features in the middle hidden layer and the difficulty of training the shallow and intermediate network in the deep network, which is called as an NAD skeleton in the embodiment of the present disclosure. The attention mechanism is used mainly for jump connections in an encoder-decoder, and a feature map obtained from the first four layers of the encoder is enabled to pass through the attention mechanism to obtain a feature map with an attention map, thus assisting the decoder. After the decoder performs decoding, the segmentation result of multiple layers is obtained, and the NAD skeleton is constrained using the balanced temperature loss (BTL) improved in the embodiment of the present disclosure, and then the learning process of the network is optimized by combining back propagation and the improved rigid temperature loss, further alleviating the possible problem of a local optimum of most networks. When the network is trained to a certain degree, the degree of training is measured by STL in the later, and the embodiment of the present disclosure further fine-tunes the network by improving the learning rate, thereby enhancing the segmentation capability of the network. The technical solution is innovative in three main ways of adaptive learning constraint, network optimization, and fine-tuning of the learning capability of the network.

Figure 4:
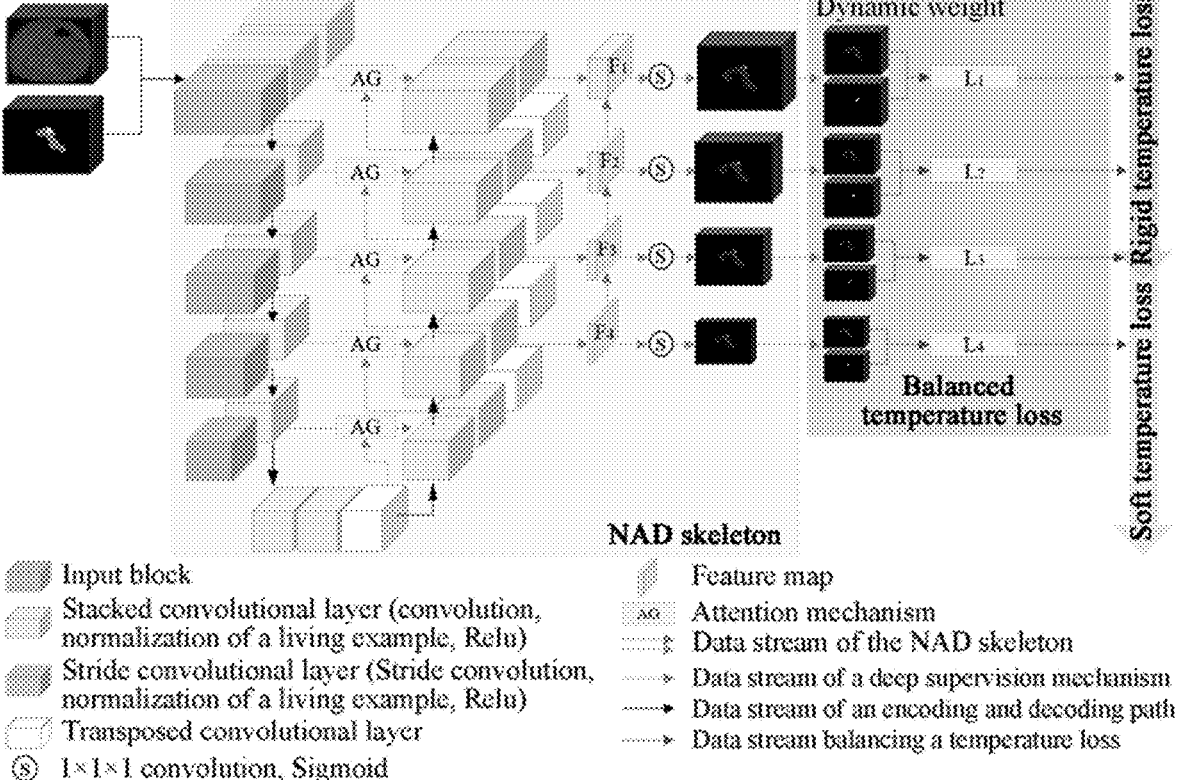
FIG. 4 is a block diagram of an embodiment of the present invention.

During specific implementation, the block diagram is shown in FIG. 4. The original U-Net with the addition of the attention mechanism as well as the deep supervision mechanism is referred to as the NAD network skeleton. The specific operations included in the skeleton are as shown in Table 1 below.

TABLE 1

| Layer name | Component | Output size |
|---|---|---|
| Stacked Conv 1 | [3 × 3 × 3, 32] × 2 | [64, 192, 192] |
| Stride Conv 1 | [3 × 3 × 3, 64], stride 2 × 2 × 2 | [32, 96, 96] |
| Stacked Conv 2 | [3 × 3 × 3, 64] | [32, 96, 96] |
| Stride Conv 2 | [3 × 3 × 3, 128], stride 2 × 2 × 2 | [16, 48, 48] |
| Stacked Conv 3 | [3 × 3 × 3, 128] | [16, 48, 48] |
| Stride Conv 3 | [3 × 3 × 3, 256], stride 2 × 2 × 2 | [8, 24, 24] |
| Stacked Conv 4 | [3 × 3 × 3, 256] | [8, 24, 24] |
| Stride Conv 4 | [3 × 3 × 3, 320], stride 2 × 2 × 2 | [4, 12, 12] |
| Stacked Conv 5 | [3 × 3 × 3, 320] | [4, 12, 12] |
| Stride Conv 5 | [3 × 3 × 3, 320], stride 1 × 2 × 2 | [4, 6, 6] |
| Stacked Conv 6 | [3 × 3 × 3, 320] | [4, 6, 6] |
| Transposed Conv 1 | [1 × 2 × 2, 320] | [4, 12, 12] |
| AG 1 | I: 320, O: 320 | [4, 12, 12] |
| Stacked Conv 7 | [3 × 3 × 3, 320] × 2 | [4, 12, 12] |
| Transposed Conv 2 | [2 × 2 × 2, 256] | [8, 24, 24] |
| AG 2 | I: 256, O: 256 | [8, 24, 24] |
| Stacked Conv 8 | [3 × 3 × 3, 128] × 2 | [8, 24, 24] |
| Side-Conv 1 | [1 × 1 × 1, 256] | [8, 24, 24] |
| Transposed Conv 3 | [2 × 2 × 2, 128] | [16, 48, 48] |
| AG 3 | I: 128, O: 128 | [16, 48, 48] |
| Stacked Conv 9 | [3 × 3 × 3, 64] × 2 | [16, 48, 48] |
| Side-Conv 2 | [1 × 1 × 1, 128] | [16, 48, 48] |
| Transposed Conv 4 | [2 × 2 × 2, 64] | [32, 96, 96] |
| AG 4 | I: 64, O: 64 | [32, 96, 96] |
| Stacked Conv 10 | [3 × 3 × 3, 32] × 2 | [32, 96, 96] |
| Side-Conv 3 | [1 × 1 × 1, 64] | [32, 96, 96] |
| Transposed Conv 5 | [2 × 2 × 2, 32] | [64, 192, 192] |
| AG 5 | I: 32, O: 32 | [64, 192, 192] |

TABLE 1-continued

| Layer name | Component | Output size |
|---|---|---|
| Stacked Conv 11 | [3 × 3 × 3, 32] × 2 | [64, 192, 192] |
| Final Conv | [1 × 1 × 1, 32] | [64, 192, 192] |

I and O represent an input channel and an output channel respectively. "3×3×3, 32' means a 3×3×3 convolutional layer with the output channel being 32. "[ ]×2" indicates 2 repetitions. "[3×3×3, 32], stride 2×2×2" means a 3×3×3 convolutional layer with a step size of 2×2×2. Side-Conv denotes the output of each layer in the decoder, and the output forms an important part of the deep supervision mechanism.

The attention mechanism is more common, namely, a corresponding attention map is generated for the input to highlight features in a target region, reserving only activations which are valid for a particular task. The output is a feature map with an attention map (the product of the attention map and an input feature map).

After obtaining the output result for each layer, the embodiment of the present disclosure uses the deep supervision mechanism and the balanced temperature loss proposed in the embodiment of the present disclosure to further constrain the learning capability of the network. Temperature is widely used as a regulatory factor in various fields such as the molecular dynamics and the quantum mechanics. On this basis, the embodiment of the present invention designs the balanced temperature loss (BTL) to dynamically adjust the learning weight according to the temperature, resulting in a good performance of segmentation of both the tumor and the pancreas. The advantage of using the above way is that the learning weights of the targets (i.e., the tumor and the pancreas) are dynamically adjusted to further enhance the segmentation performance of the network for the tumor while ensuring the segmentation performance of the relatively large target (pancreas). The practical operation thereof is that the embodiment of the present disclosure combines the binary cross-entropy loss function and the soft Dice loss as the loss function of the framework to constrain learning. Temperature is introduced in the soft Dice loss to dynamically adjust the learning weight between the tumor and the pancreas to balance feature selection. The pancreas is given a relatively large weight under the guidance of temperature at the early stage of network learning, and then the tumor region is dynamically given a larger weight as the network learning continues, so as to ensure that the features of the pancreas and the tumor can be dynamically learned in the process of network learning. Guided by the temperature, the loss $L_1$–$L_4$ of each layer of the decoder can be expressed as:

$$L_i = -\frac{1}{N}\sum_{n=0}^{N-1}(y_p + y_t)[\ln(y_{sp} + y_{st}) + (1 - (y_p + y_t))\ln(1 - (y_{sp} + y_{st}))] -$$

$$\frac{1}{2}\left(T\frac{2\sum_{n_p}y_p y_{sp}}{\sum_{n_p}(y_p + y_{sp})} + (1 - T)\frac{2\sum_{n_t}y_t y_{st}}{\sum_{n_t}(y_t + y_{st})}\right)$$

$$T = \begin{cases} T_{max}\lceil T_k\rceil, & T_k \in [T_{max}, 1] \\ T_k & T_k \in (T_{min}, T_{max}) \\ T_{min}\lceil T_k\rceil, & T_k \in (0, T_{min}] \end{cases}$$

$$T_k^{(S_d, S_e)} = T_0 - \frac{E_k}{E_{max}}$$

where, i is the $i^{th}$ layer of the decoder, N, $n_p$ and $n_t$ are the number of samples, the number of pancreas voxels and the number of tumor voxels, respectively. $y_p$ and $y_t$ are the labels of the pancreas and the tumor, respectively. $y_{sp}$ and $y_{st}$ denote the segmentation output of the network for the pancreas and the tumor, respectively. $T_{max}$ and $T_{min}$ are the highest and lowest temperatures, respectively. As the tumor is small and always embedded in the pancreas, adequate learning of the pancreas will facilitate feature extraction of the tumor. To ensure that features of both the pancreas and the tumor are learned during the overall learning process, T is limited by $T_{max}$ and $T_{min}$. T is designed to be decreased from $T_{max}$, and $T_k$ is dynamically adjusted along with $E_k$ (the $k^{th}$ epoch). The initial temperature $T_0$=1. As T decreases, the learning focus of the network shifts from the pancreas to the tumor. To better use T to guide learning, the embodiment of the present disclosure proposes two strategies: $S_d$ and $S_e$ strategies, used for adjusting $T_k$. In the $S_d$ strategy changes, $T_k$ changes based on each $E_k$, while in the $S_e$ strategy, $T_k$ changes based on the interval k.

At this moment, BTL can be expressed under the influence of the deep supervision mechanism as:

$$BTL = \sum_{i=1}^{4}\frac{\omega_i}{\sum_{i=1}^{4}\omega_i}L_i, \omega_i = \frac{1}{2^i}$$

the above is the first innovation of the embodiment of the present disclosure.

Figure 5:
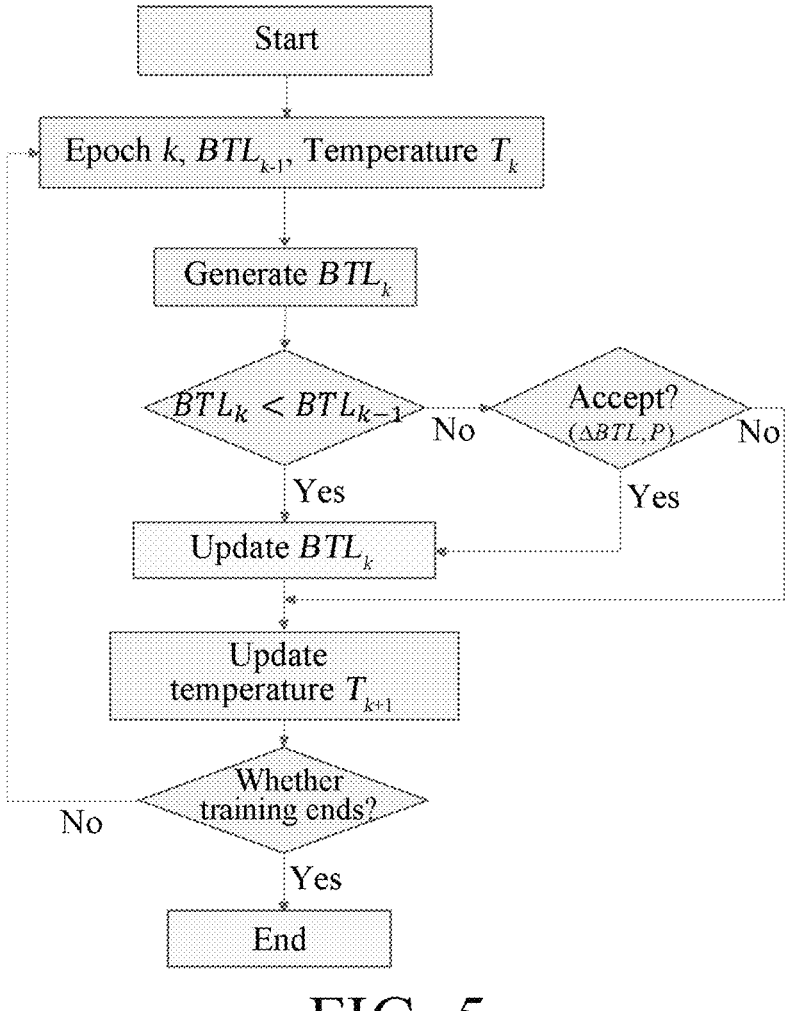
FIG. 5 is a flowchart of a training method according to an embodiment of the present invention.

In addition, to avoid the case where the network falls into a local optimum and an unsatisfactory result is generated, based on the Metropolis principle, the embodiment of the present disclosure proposes the rigid temperature loss (RTL) accepting an unimproved shift with a certain probability to guide the whole training process to optimize the loss function. The advantage is to avoid the case where the network falls into a local optimum, to further improve the network from the perspective of network optimization and to facilitate learning of the target organ.

$$BTL_k = \begin{cases} BTL_k, \text{ if } BTL_k \le BTL_{k-1}; \\ BTL_k, \text{ if } BTL_k > BTL_{k-1} \text{ and } p > \alpha; \\ BTL_{k-1}, \text{ otherwise.} \end{cases}$$

$$p = \min\left\{e^{-\frac{\Delta BTL}{T_k}}, 1\right\},$$

$$\Delta BTL = BTL_k - BTL_{k-1}$$

where, $BTL_K$ and $BTL_{K-1}$ are BTL of the $k^{th}$ epoch and BTL of the $(k-1)^{th}$ epoch, p is the acceptable probability and α is the threshold value. For the adjacent $BTL_K$ and $BTL_{K-1}$, if $BTL_K$ is less than $BTL_{K-1}$, then it is used as the current loss to guide the network parameters. Otherwise, when $BTL_K$ is greater than $BTL_{K-1}$, two cases exist to optimize the loss function. In one aspect, when pia, $BTL_K$ is reserved. In other aspect, when the current probability p is greater than the threshold value a, $BTL_{K-1}$ is accepted. However, if p is too small, the network converges prematurely and falls into a local optimum. In contrast, a larger p can also cause the network to consume too much time during the training process. To alleviate the above problems, the embodiment of the present disclosure proposes to dynamically adjust p using the internal temperature $T_k$. As the internal temperature $T_k$ decreases, the probability p decreases and the network moves from a fully trained state to a convergence state, globally guiding the entire network. The specific procedure is shown in FIG. 5.

The above is the second innovation of the embodiment of the present disclosure.

The embodiment of the present disclosure further proposes the soft temperature loss (STL), which updates the average shift of the loss by means of temperature to control the learning speed. In the embodiment of the present disclosure, it is considered that the learning pace of the network can be further fine-tuned to learn more fine-grained information to achieve a better segmentation result when the learning capability of the network reaches a certain level. The advantage is to achieve the goal of fine-tuning the network to further refine the segmentation result when the segmentation result of the tumor and the pancreas tend to be steady.

$$STL_k = \begin{cases} BTL_k, k = 1 \\ T_k^* STL_{k-1} + [1 - T_k^*]BTL_k, k > 1 \end{cases}$$

where, $STL_K$ and $STL_{K-1}$ are STL of the $k^{th}$ epoch and STL of the $(k-1)^{th}$ epoch respectively, and $T_k$ is the current temperature. $T_k^* = \mu - v(1-T_k)$ is the linear projection of the temperature $T_k$. Inspired by the Particle Swarm Optimization (PSO) algorithm with inertia factors, $\mu$ and $v$ are set to 0.9 and 0.5, respectively. As the network tends to be steady, $T_K$ decreases, STL shifts the focus from the average loss to the current loss, reflecting network changes more accurately.

The embodiment of the present disclosure further uses STL to assist the network in adaptively adjusting the learning rate in the event of a greater focus on the $k^{th}$ loss.

$$\Delta STL_{k-1,k} = STL_k - STL_{k-1}$$

$$lr_k = lr_{initial} \times \left(1 - \left(\frac{E_k}{E_{max}}\right)^{power}\right)$$

$$LR_k = \begin{cases} \beta lr_k, & \{\Delta STL_{k-\tau-1,k-\tau}, \dots, \Delta STL_{k-1,k}\} < \gamma \\ \min\{lr_k, LR_{k-1}\}, & \text{otherwise} \end{cases}$$

where, $\Delta STL_{K-LK}$ is the amount of change in STL between the adjacent epoch k and epoch k−1. $lr_k$ is the learning rate guided by the poly strategy, $lr_{initial}$ is the initial learning rate, and $E_k$ and $E_{max}$ are the $k^{th}$ epoch and the maximum epoch, respectively. power is a parameter. Based on the STL and poly strategies, the embodiment of the present disclosure proposes a hybrid learning rate strategy to facilitate the learning and convergence of the model. $LR_K$ and $LR_{K-1}$ are the learning rates of the $k^{th}$ epoch and the $(k-1)^{th}$ epoch, respectively. If for $ASTL_{K-1,K}$ cannot be increased by $\gamma$ within time of $\tau$, the learning rate is lowered by $\beta(\beta \in (0, 1))$, so that the network is refined to a certain extent.

The above is the third innovation.

To better fit the pancreas and tumor data, $T_{max}$ and $T_{min}$ are set to 0.9 and 0.3, respectively. The embodiment of the present disclosure uses the $S_d$ strategy, a is set to 0.7, power is 0.9 and $\beta$ is 0.8. r is 30 and $\gamma$ is $5 \times e^{-3}$.

The embodiment of the present disclosure proposes an end-to-end 3D FCN guided by the three temperature losses (i.e., balanced, rigid and soft temperature losses) to jointly segment the pancreas and the tumor. The present invention proposes the adaptive losses, i.e., the balanced temperature loss (BTL), which allows the network to dynamically adjust the learning weight between the pancreas and the tumor under the guidance of temperature to fully learn the features of the pancreas and the tumor. Inspired by the Metropolis principle, the present invention proposes the rigid temperature loss (RTL) to perform global optimization on the network by accepting unimproved learning with a certain probability. The present invention proposes the soft temperature loss (STL) to update the mean shift value of the loss and to determine the learning trend and convergence range of the network to further refine the segmentation of the pancreas and the tumor.

For comparison, the method in this embodiment is evaluated on the MSD pancreas dataset. The evaluation indexes in the experiment are: a Dice similarity coefficient (DSC), a Jaccard similarity coefficient (Jaccard), an average surface distance (ASD) and a positive predictive value (PPV). After 5-fold cross-validation, the mean values obtained on the pancreas and the tumor are 85.06%, 74.68%, 2.37 mm, 85.90% and 59.16%, 47.13%, 7.96 mm, 67.22%, respectively, superior to the previous method.

Figure 2:
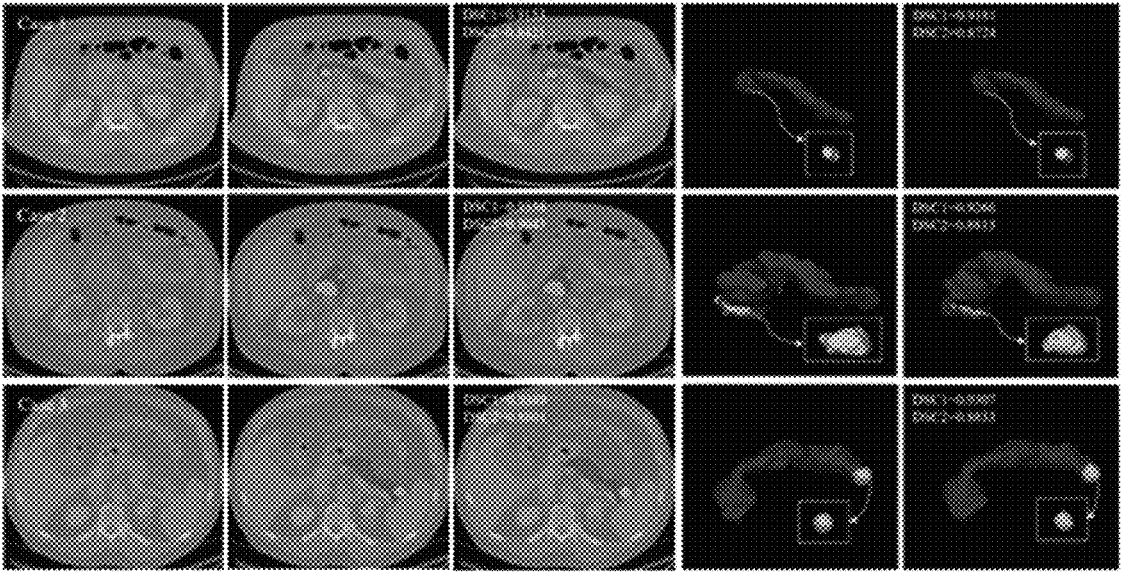
FIG. 2 is a schematic diagram of the result of joint segmentation of pancreases and tumors for three cases (case 1, case 2, case 3) on an MSD dataset according to an embodiment of the present invention.

FIG. 2 is the result of joint segmentation of pancreases and tumors for three cases (case 1, case 2, case 3) on an MSD dataset. From left to right, they are the original CT image, the CT image with a label, the network 2D segmentation result display map of the embodiment of the present disclosure, and the network 3D segmentation result display map of the embodiment of the present disclosure. The pancreas is marked in the corresponding color and the tumor is marked in another color. DSC1 is represented as the pancreas result and DSC2 is represented as the tumor result.

To further validate the effectiveness and robustness of the network proposed by the present invention, the embodiment of the present disclosure also uses the network to segment regions of whole tumor (WT), tumor core (TC) and enhanced tumor (ET) simultaneously from the 2020BraTs dataset. The method proposed in the embodiment of the present disclosure achieves a better segmentation performance with DSC values of 91.85%, 88.09% and 78.02% for WT, TC and ET, respectively.

Figure 3:
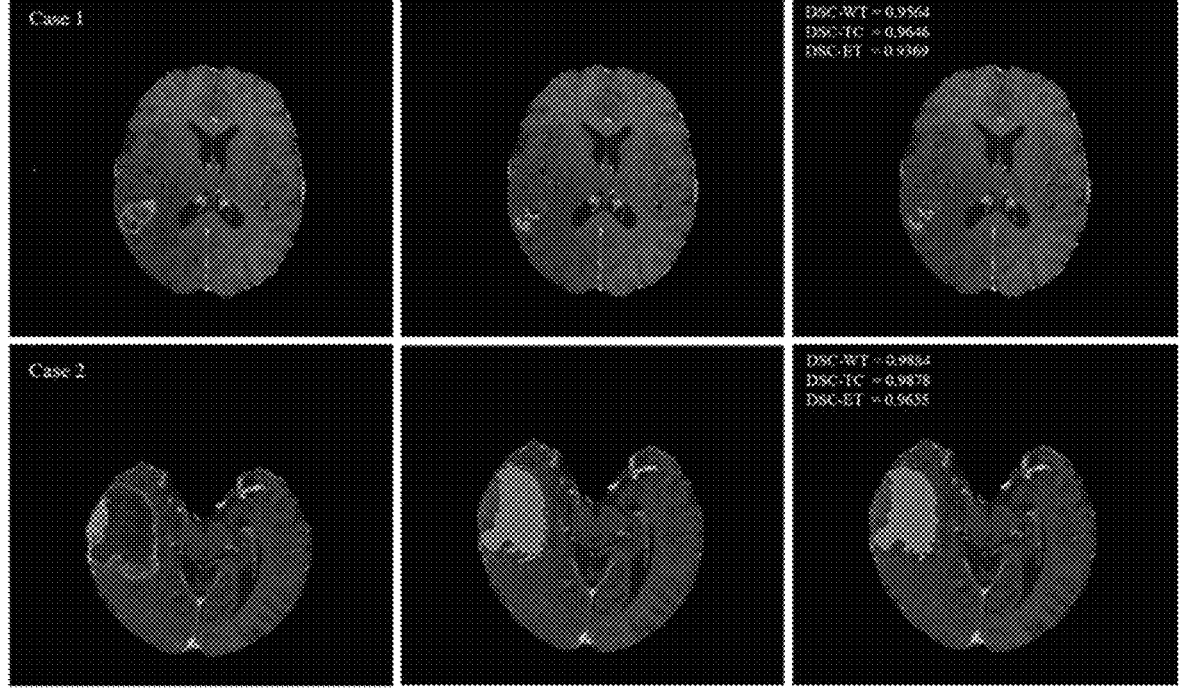
FIG. 3 is a schematic diagram of the result of joint segmentation for two cases (case 1, case 2) on a 2020BraTs dataset over three regions of whole tumor (WT), tumor core (TC) and enhanced tumor (ET)

FIG. 3 is the result of joint segmentation of two cases (case 1, case 2) on the 2020BraTs dataset over three regions of whole tumor (WT), tumor core (TC) and enhanced tumor (ET). From left to right, they are the original MRI image, the Mill image with a label, and the network 2D segmentation result display map of the embodiment of the present disclosure. The WT region is labeled in three colors of red, blue and green; the TC region is labeled in two colors of blue and green; and the ET region is labeled in green. DSC-WT, DSC-TC and DSC-ET indicate the DSC values of the whole tumor (WT), tumor core (TC) and enhanced tumor (ET), respectively.

Segmenting accurate target point contours is made more difficult due to the small and variable shape of the segmentation targets (i.e., the pancreas and the tumor) and the presence of metal biliary stents (which can produce significant streaking artefacts) in 74 cases of the 281 patients on the MSD pancreas dataset. For tumors, the models of the solution of the present disclosure achieves a segmentation result of 59.16% in terms of DSC. In addition, the three temperature losses proposed in this embodiment can significantly improve the tumor segmentation performance.

Embodiment II

This embodiment aims to provide a computer device, including a memory, a processor and a computer program stored on the memory and capable of running on the processor, the processor, when executing the program, implementing the steps of the method described above.

Embodiment III

This embodiment aims to provide a computer-readable storage medium.

A computer program is stored on the computer-readable storage medium, the program, when executed by a processor, implementing the steps of the method described above.

Embodiment IV

This embodiment aims to provide a system for segmenting three-dimensional images of pancreases and tumors, including:

an image processing module, configured to acquire 3D images of the pancreas and the tumor and preprocess same with a soft tissue window to control the intensity value of the image within a set range;

a network training module, configured to crop all images into block-shaped regions of a set size and feed same into a trained convolutional neural network model, and when training a network, dynamically adjust the learning weight between the pancreas and the tumor under the guidance of temperature to learn the features of the pancreas and the tumor; and a segmenting module, configured to after performing data preprocessing on the 3D images of the pancreas and labels, use the trained network model for online testing and evaluating, and output the segmentation result.

The steps involved in the apparatus of Embodiments II, III and IV above correspond to the Method Embodiment I, with the specific implementation modes capable of referring to the relevant description section of Embodiment I. The term "computer-readable storage medium" should be understood as a single medium or a plurality of media including one or more instruction sets, and should also be understood to include any medium which is capable of storing, encoding or carrying the instruction set executed by a processor and enabling the processor to perform any one of the methods of the present invention.

It should be understood by those of skill in the art that various modules or steps of the present invention described above may be implemented with a universal computer device, and optionally, they can be implemented by program codes executable by a computing device, so that they can be stored in a storage device for execution by the computing device, or they can be made separately into individual integrated circuit modules, or a plurality of modules or steps of them can be made into a single integrated circuit module for implementation. The present invention is not limited to any particular combination of hardware and software.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

What is claimed is:

1. A method for segmenting three-dimensional (3D) images of pancreases and tumors, comprising:

acquiring 3D images of the pancreas and the tumor and preprocessing same with a soft tissue window to control an intensity value of the image within a set range;

cropping all images into block-shaped regions of a set size and feeding same into a convolutional neural network model, and when training a network, dynamically adjusting a learning weight between the pancreas and the tumor under the guidance of temperature to learn features of the pancreas and the tumor;

after performing data preprocessing on the 3D images of the pancreas and labels, using a trained network model for online testing and evaluating, and outputting the segmentation result; and using a balanced temperature loss (BTL) to dynamically adjust the learning weight according to the temperature, resulting in a good performance of segmentation of both the tumor and the pancreas;

under an influence of a deep supervision mechanism, BTL being expressed as:

$$BTL = \sum_{i=1}^{4} \frac{\omega_i}{\sum_{i=1}^{4} \omega_i} L_i, \omega_i = \frac{1}{2^i};$$

where, $L_i$ is the loss of each layer of a decoder, i=1,2,3,4;

the network being trained in combination with a binary cross-entropy loss function and the soft Dice loss as a loss function of an NAD skeleton to constrain learning, and temperature being introduced in the soft Dice loss to dynamically adjust the learning weight between the tumor and the pancreas to balance feature selection; and the pancreas being given a large weight under the guidance of temperature at an early stage of network learning, and then a tumor region being dynamically given a larger weight as the network learning continues, so that the features of the pancreas and the tumor can be dynamically learned in a process of network learning.

2. The method for segmenting three-dimensional images of pancreases and tumors according to claim 1, wherein the convolutional neural network model is based on an original U-Net with an addition of an attention mechanism as well as a deep supervision mechanism, called the NAD skeleton.

3. The method for segmenting three-dimensional images of pancreases and tumors according to claim 2, wherein the attention mechanism is used for jump connections in an encoder-decoder, and a feature map obtained from the first four layers of the encoder is enabled to pass through the attention mechanism to obtain a feature map with an attention map, thus assisting the decoder;

after the decoder performs decoding, the segmentation result of multiple layers is obtained, and the NAD skeleton is constrained using the balanced temperature loss, and the learning process of the network is globally optimized by combining back propagation and a rigid temperature loss to alleviate a possible problem of a local optimum;

$$BTL_k = \begin{cases} BTL_k, \text{ if } BTL_k \leq BTL_{k-1}; \\ BTL_k, \text{ if } BTL_k > BTL_{k-1} \text{ and } p > \alpha; \\ BTL_{k-1}, \text{ otherwise} \end{cases}$$

-continued $$p = \min\left\{ e^{-\frac{\Delta BTL}{T_k}}, 1 \right\},$$

$$\Delta BTL = BTL_k - BTL_{k-1};$$

where, $BTL_k$ and $BTL_k$ are BTL of the $k^{th}$ epoch and BTL of the $(k-1)^{th}$ epoch, p is the acceptable probability, $\alpha$ is a threshold value, and $T_k$ is a current temperature;

when the network is trained to a near-convergence state, a soft temperature loss is used for updating an average shift value of the loss, the convolutional neural network model is further fine-tuned by improving a learning rate, and a learning trend and a convergence range of the convolutional neural network model is determined to further refine the segmentation of the pancreas and the tumor;

$$STL_k = \begin{cases} BTL_k, & k = 1 \\ T_k^* STL_{k-1} + [1 - T_k^*]BTL_k, & k > 1 \end{cases};$$

where, $STL_k$ and $STL_{k-1}$ are STL of the $k^{th}$ epoch and STL of the $(k-1)^{th}$ epoch respectively, and $T_k$ is the current temperature; and $T_k^* = \mu - v(1 - T_k)$ is a linear projection of the temperature $T_k$, and parameters $\mu$ and $v$ are set to 0.9 and 0.5, respectively.

4. The method for segmenting three-dimensional images of pancreases and tumors according to claim 3, wherein the balanced temperature loss is used so that the network dynamically adjusts the learning weight between the pancreas and the tumor under the guidance of temperature to learn the features of the pancreas and the tumor.

5. The method for segmenting three-dimensional images of pancreases and tumors according to claim 3, wherein the learning process of the network is globally optimized by combining back propagation and the rigid temperature loss, specifically:

the acceptable probability is dynamically adjusted using an internal temperature; and as the internal temperature decreases, the acceptable probability decreases and the network moves from a fully trained state to a convergence state, globally guiding the entire network.

6. The method for segmenting three-dimensional images of pancreases and tumors according to claim 3, wherein the soft temperature loss is used for assisting the network in adaptively adjusting the learning rate in the event of the $k^{th}$ loss.

7. A computer device, comprising a memory, a processor and a computer program stored on the memory and capable of running on the processor, wherein the processor, when executing the program, implements the steps of the method according to claim 1.

8. A non-transitory computer-readable storage medium, on which at least one computer program is stored, wherein the at least one program, when executed by a processor, implements the steps of the method according to claim 1.

* * * * *